United States Patent
Kotadia et al.

(10) Patent No.: US 11,343,166 B2
(45) Date of Patent: May 24, 2022

(54) HEALTH STATUS MONITORING FOR SERVICES PROVIDED BY COMPUTING DEVICES

(71) Applicant: Apple Inc., Cupertino, CA (US)

(72) Inventors: Hiren R. Kotadia, Sunnyvale, CA (US); Mufaddal Y. Khumri, San Jose, CA (US); Jordan L. Redner, Redwood City, CA (US); Lawrence W. Chang, San Francisco, CA (US); Tom M. Kim, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/182,124

(22) Filed: Feb. 22, 2021

(65) Prior Publication Data

US 2021/0250265 A1   Aug. 12, 2021

Related U.S. Application Data

(62) Division of application No. 15/962,885, filed on Apr. 25, 2018, now Pat. No. 10,938,696.

(Continued)

(51) Int. Cl.
*H04L 43/0817* (2022.01)
*H04L 43/091* (2022.01)
(Continued)

(52) U.S. Cl.
CPC .......... *H04L 43/0817* (2013.01); *G06F 9/541* (2013.01); *G06F 9/547* (2013.01);
(Continued)

(58) Field of Classification Search
CPC ..... G06F 9/541; G06F 9/547; H04L 41/5035; H04L 43/0817; H04L 43/12; H04L 47/822; H04L 61/1511
See application file for complete search history.

(56) References Cited

U.S. PATENT DOCUMENTS 7,143,153 B1   11/2006   Black et al.
7,730,364 B2    6/2010   Chang et al.
(Continued)

FOREIGN PATENT DOCUMENTS

CN   105224296 A   1/2016

OTHER PUBLICATIONS

Amazon Web Services. "Amazon Route 53 FAQs", publicly posted Oct. 29, 2017, 29 pages. (Year: 2017).*
(Continued)

*Primary Examiner* — George C Neurauter, Jr.
(74) *Attorney, Agent, or Firm* — Dickinson Wright RLLP

(57) ABSTRACT

This application sets forth various techniques for monitoring a status of a service. According to some embodiments, a DNS server can implement a health check engine that monitors the status of the service in order to implement round-robin DNS among a plurality of availability zones. Each service instance for the service can include a monitoring agent configured to (1) monitor the status of the service instance, and (2) respond to health check messages received from the health check engine. The monitoring agent can also be configured to (1) collect statistics associated with one or more service dependencies of the service instance during a tracking window, (2) calculate at least one ratio based on the statistics collected during the tracking window, and (3) generate the status of the service instance by comparing the at least one ratio to a threshold value.

20 Claims, 7 Drawing Sheets

Related U.S. Application Data

(60) Provisional application No. 62/609,245, filed on Dec. 21, 2017.

(51) Int. Cl.

| | | |
|---|---|---|
| *G06F 9/54* | (2006.01) | |
| *H04L 47/70* | (2022.01) | |
| *H04L 43/12* | (2022.01) | |
| *H04L 61/4511* | (2022.01) | |
| *H04L 67/1008* | (2022.01) | |
| *H04L 67/1001* | (2022.01) | |
| *H04L 41/5009* | (2022.01) | |
| *H04L 43/0805* | (2022.01) | |
| *H04L 43/04* | (2022.01) | |
| *H04L 41/14* | (2022.01) | |
| *H04L 67/10* | (2022.01) | |
| *H04L 67/75* | (2022.01) | |
| *H04L 43/022* | (2022.01) | |
| *H04L 43/0823* | (2022.01) | |
| *H04L 67/133* | (2022.01) | |
| *H04L 41/12* | (2022.01) | |
| *H04L 43/08* | (2022.01) | |
| *H04L 43/02* | (2022.01) | |
| *H04L 41/0893* | (2022.01) | |
| *H04L 41/046* | (2022.01) | |
| *H04L 43/16* | (2022.01) | |

(52) U.S. Cl.
CPC .......... *H04L 41/5035* (2013.01); *H04L 43/12* (2013.01); *H04L 47/822* (2013.01); *H04L 61/1511* (2013.01); *H04L 41/046* (2013.01); *H04L 41/0893* (2013.01); *H04L 41/12* (2013.01); *H04L 41/145* (2013.01); *H04L 41/5009* (2013.01); *H04L 41/5016* (2013.01); *H04L 43/02* (2013.01); *H04L 43/022* (2013.01); *H04L 43/04* (2013.01); *H04L 43/08* (2013.01); *H04L 43/0805* (2013.01); *H04L 43/0823* (2013.01); *H04L 43/16* (2013.01); *H04L 67/10* (2013.01); *H04L 67/1002* (2013.01); *H04L 67/1008* (2013.01); *H04L 67/36* (2013.01); *H04L 67/40* (2013.01)

(56) References Cited

U.S. PATENT DOCUMENTS

| | | |
|---|---|---|
| 8,069,435 B1 | 11/2011 | Lai |
| 8,255,528 B2 | 8/2012 | Raja et al. |
| 8,908,521 B2 | 12/2014 | Dyke et al. |
| 8,930,395 B2 | 1/2015 | Sharma et al. |
| 9,348,710 B2 | 5/2016 | Al-Wahabi |
| 10,044,629 B1 | 8/2018 | Raftery |
| 10,135,916 B1 | 11/2018 | Farhangi et al. |
| 10,277,488 B2 | 4/2019 | Leff et al. |
| 10,516,590 B2 | 12/2019 | Mizik et al. |
| 10,542,071 B1 | 1/2020 | Matthews et al. |
| 2008/0046558 A1* | 2/2008 | Raja ................. H04L 41/5009 709/224 |
| 2010/0011120 A1 | 1/2010 | Kommula |
| 2010/0218104 A1 | 8/2010 | Lewis |
| 2011/0153810 A1 | 6/2011 | Raja et al. |
| 2013/0326620 A1 | 12/2013 | Merza et al. |
| 2013/0339510 A1 | 12/2013 | Douglas et al. |
| 2014/0075327 A1 | 3/2014 | Noel et al. |
| 2014/0372556 A1 | 12/2014 | Holst et al. |
| 2015/0222504 A1* | 8/2015 | Srivastava .......... G06F 11/3041 709/224 |
| 2015/0295796 A1 | 10/2015 | Hsiao et al. |
| 2015/0341212 A1 | 11/2015 | Hsiao et al. |
| 2015/0358391 A1 | 12/2015 | Moon et al. |
| 2016/0119381 A1 | 4/2016 | Holst et al. |
| 2016/0323187 A1 | 11/2016 | Guzman et al. |
| 2016/0323197 A1 | 11/2016 | Guzman et al. |
| 2016/0357445 A1 | 12/2016 | Holst et al. |
| 2017/0034012 A1 | 2/2017 | Douglas et al. |
| 2017/0052662 A1 | 2/2017 | Smith, Jr. |
| 2017/0085621 A1* | 3/2017 | Tran ................. H04L 41/5009 |
| 2017/0126516 A1 | 5/2017 | Tiagi et al. |
| 2017/0126627 A1 | 5/2017 | Fang et al. |
| 2018/0159895 A1 | 6/2018 | Ma et al. |
| 2018/0278477 A1 | 9/2018 | Auvenshine et al. |
| 2018/0287916 A1 | 10/2018 | Mizik et al. |
| 2018/0316568 A1 | 11/2018 | GillL et al. |
| 2018/0351904 A1 | 12/2018 | Mizik et al. |
| 2019/0199611 A1 | 6/2019 | Kotadia et al. |
| 2019/0349407 A1 | 11/2019 | Luger |
| 2019/0356676 A1 | 11/2019 | Luger |
| 2019/0370152 A1 | 12/2019 | Godefroid et al. |
| 2020/0059399 A1 | 2/2020 | Higuchi et al. |

OTHER PUBLICATIONS

Jinesh Varia and Sajee Mathew. "Overview of Amazon Web Services", Jan. 2014, 22 pages. (Year: 2014).*
Kothamasu, et al. "System health monitoring and prognostics—a review of current paradigms and practices", Int. J. Adv. Manuf Technol, Published Mar. 15, 2006, pp. 1012-1024.
European Patent Application No. 18194517.1—Extended European Search Report dated Mar. 15, 2019.
Internet Engineering Task Force (IETF). "Request for Comments (RFC) 7231: Hypertext Transfer Protocol (HTTP/1.1): Semantics and Content", Jun. 2014, 101 pages.
Splunk.com. "how to calculate/monitor the error rate (in minutes or hours), using HTTP response codes", 5 pages, (Year: 2013).
European Patent Application No. 18194517.1—Communication Pursuant to Article 94(3) EPC dated Apr. 7, 2020.
Chinese Patent Application No. 201811134606.9—First Office Action dated Oct. 13, 2021.

* cited by examiner

HEALTH STATUS MONITORING FOR SERVICES PROVIDED BY COMPUTING DEVICES

CROSS-REFERENCE TO RELATED APPLICATIONS

The present application is a divisional of U.S. patent application Ser. No. 15/962,885, entitled "HEALTH STATUS MONITORING FOR SERVICES PROVIDED BY COMPUTING DEVICES," filed Apr. 25, 2018, set to issue Mar. 2, 2021 as U.S. Pat. No. 10,938,696, which claims the benefit of U.S. Provisional Application No. 62/609,245, entitled "HEALTH STATUS MONITORING FOR SERVICES PROVIDED BY COMPUTING DEVICES," filed Dec. 21, 2017, the content of which is incorporated herein by reference in its entirety for all purposes.

FIELD

The described embodiments relate generally to network-based services. More particularly, the present embodiments relate to a technique for monitoring a status of network-based services that include service dependencies.

BACKGROUND

Cloud-based services have become ubiquitous in today's digital economy. Mobile devices include a large number of applications configured to request data from one or more services accessed via the Internet. For example, a ride-sharing application can be utilized to order a car that is directed to pick a user up at a location provided by a global positioning system (GPS) sensor in the user's mobile device. Real-time data such as stock prices and sports scores can be delivered to an application that aggregates data on a display screen. A cloud-based storage service enables files to be shared or processed by a number of devices permitted to access to the cloud-based storage service. A cloud-based computing service enables large quantities of computing power located in remote data centers to be utilized by a client device on demand to solve complex problems that involve large amounts of computations (e.g., processing of raw scientific data). The examples of types of services that have been implemented on the Internet are substantial in diversity and number.

Notably, a service can be deployed in multiple regions and multiple availability zones within each region in order to ensure high-availability of the service to client devices. Redundancy is one way to eliminate single points of failure, which involves establishing service instances on servers in multiple availability zones at varying geographic locations around the world. The Domain Name System (DNS) provides a means for locating a service endpoint on the Internet by associating or responding to a lookup by host name with a network address such as an Internet Protocol (IP) version 4 (IPv4) or version 6 (IPv6) network address. Additionally, the DNS servers can employ or integrate a capability to monitor the statuses of the services across the different IP addresses as part of the DNS system itself. In turn, the DNS servers can add or remove associations between a host name for the service and different IP addresses based on the status of the service. In this manner, the requests from client devices directed to the host name for the service can be prevented from being transmitted to a service instance that is experiencing downtime. Unfortunately, conventional techniques for monitoring the status of a service are poorly implemented. For example, services can be classified as unavailable when a problem is related to dependencies associated with other services that are experiencing downtime. Furthermore, when a service is classified as unavailable, techniques for reclassifying the service as available (when appropriate) are typically ineffective, thereby increasing the downtime perceived by the client devices.

SUMMARY

In view of the foregoing, what is desired is an improved technique for monitoring the status of a service with various service dependencies. Accordingly, and as set forth in greater detail herein, this application describes various embodiments that relate to a technique for (1) determining a status of a service instance, and (2) reporting the status of the service instance to a health check engine upstream of the service instance, thereby enabling a Domain Name System (DNS) server to classify, with accuracy and speed, an association of a host name for the service and a network address corresponding to the service instance.

According to some embodiments, a DNS server can implement a health check engine that monitors the status of a service in order to implement round-robin DNS services among a plurality of regions and/or availability zones. In this regard, each service instance for the service can include a monitoring agent configured to (1) monitor the status of the service instance, and (2) respond to health check messages received from the health check engine. According to some embodiments, the monitoring agent can be configured to (1) collect statistics associated with one or more service dependencies of the service instance during a tracking window, (2) calculate at least one ratio based on the statistics collected during the tracking window, and (3) generate the status of the service instance by comparing the at least one ratio to a threshold value.

In some embodiments, the monitoring agent for a service instance collects statistics associated with each service dependency in one or more service dependencies. According to some embodiments, the statistics for a service dependency associated with a network interface can include one or more of (1) a number of additional requests transmitted to the service dependency via the network interface, (2) a number of successful responses received from the service dependency, and (3) a number of failed responses received from the service dependency, where the statistics are collected during a period of time. In turn, the monitoring agent analyzes the statistics to determine a status of the service instance. The status of the service instance reflects, in the aggregate, the status of each service dependency of the one or more service dependencies. In various embodiments, the monitoring agent can be configured to calculate, for each service dependency, a ratio of successful responses to failed responses received from the service dependency. The status of the service instance is then determined by comparing each ratio associated with a service dependency to a threshold value. In particular, the status of the service instance is construed as a first state (e.g., positive) when the ratio for each service dependency is above the threshold value, and construed as a second state (e.g., negative) when the ratio for any service dependency is below the threshold value.

In some embodiments, the monitoring agent monitors the responses generated by the service instance to determine the status of the service instance instead of monitoring the responses received from the service dependencies. The responses generated by the service instance will reflect the responses received from the service dependencies, in the aggregate, because any failed response received from a service dependency will cause the response generated by the service instance to also be a failed response. Additionally, the monitoring agent can be configured to calculate a ratio of successful responses to failed responses generated by the service instance, and compare the ratio to a threshold value to determine a status of the service instance.

In some embodiments, the statistics are checked to determine if the ratio is statistically relevant before determining the status of the service instance. When the statistics collected during the tracking window indicate that the ratio is based on a number of requests received by the service instance during the tracking window—or, alternatively, a number of additional requests transmitted to one or more of the service dependencies during the tracking window—that is less than a threshold value, the status of the service instance is maintained as determined during a previous tracking window.

In some embodiments, a server computing device can implement a load balancer for a service that includes a distributed implementation of a number of service instances executing on a plurality of server computing devices. According to some embodiments, the load balancer can include a monitoring agent configured to monitor the status of the service based on the status of each of the service instances. In particular, the monitoring agent can be configured to (1) receive a health check message from a health check engine over a network interface, (2) generate a status of the service based on the status of the service instances, and (3) transmit the status of the service to the health check engine. In some embodiments, the monitoring agent can be configured to (1) forward the health check message to the service instances, (2) receive a response to the health check message from each service instance, (3) calculate a ratio based on a number of positive responses and a number of negative responses in the responses received from the service instances, and (4) compare the ratio to a threshold value to determine the status of the service.

In some embodiments, the status of a service instance or the status of the service can be reflected in a hypertext transfer protocol (HTTP) response message. In particular, a status code and/or a status message can be selected and included in the HTTP response message that reflects a state of the status of the service or service instance. According to some embodiments, the selected status code can be a standard HTTP status code (e.g., 200 Okay, 503 Service Unavailable, etc). However, custom status codes and/or status messages can also be included in the HTTP response message to indicate the state of the status of a service or service instance. Alternatively, a message body of the HTTP response message can reflect the state of the status of the service or service instance.

Other aspects and advantages of the application will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
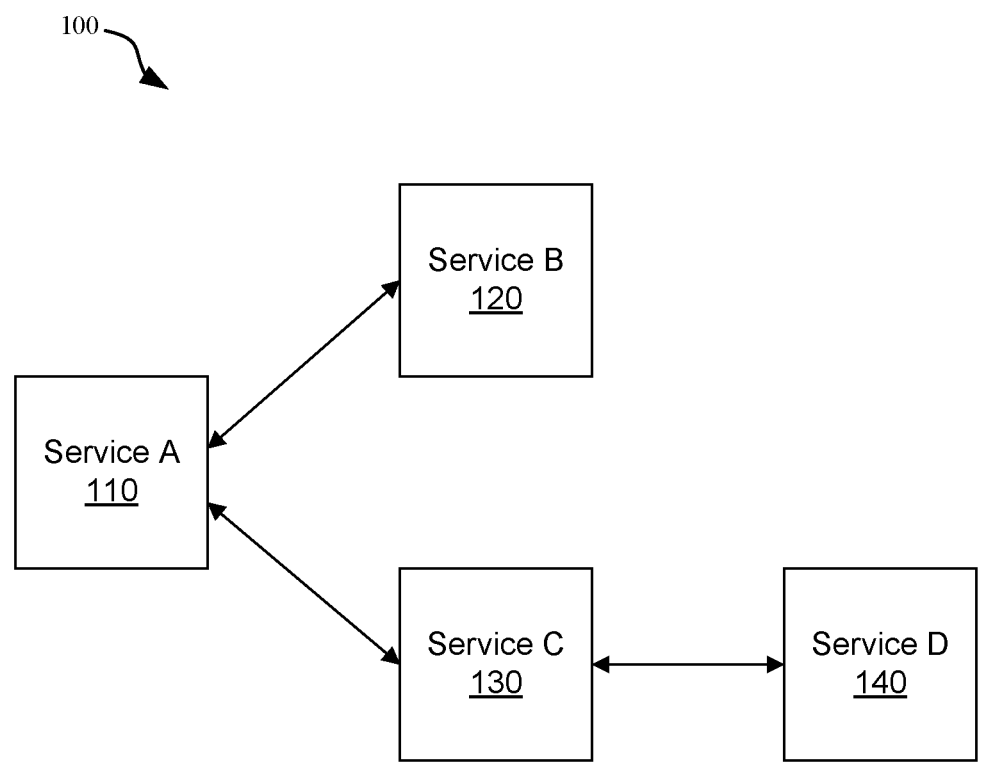
FIG. 1 illustrates a block diagram of a distributed environment that can be configured to implement different aspects of the various techniques described herein, in accordance with some embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This application describes a technique for monitoring the status of instances of a service implemented in a distributed service environment. According to some embodiments, the service can be implemented as a plurality of service instances in multiple availability zones and one or more geographic regions. As previously noted herein, the plurality of service instances can be implemented across multiple server computing devices included in one or more data centers. Consequently, there is a desire to implement an efficient health status monitoring system that can be utilized, among other applications of the health status monitoring system, to reduce downtime for the service when the service is classified as unavailable by a Domain Name System (DNS).

To achieve the foregoing, a monitoring agent can be implemented by the service, and a server computing device can execute an instance of the service, referred to herein as a service instance. According to some embodiments, the monitoring agent can be configured to collect statistics related to network traffic flowing into or out of the service instance. The network traffic reflects whether the service instance is successfully responding to requests received by the service or is failing to respond to the requests due to failures caused by one or more downstream services, which are referred to herein as service dependencies. In this regard, the monitoring agent can collect statistics based on the traffic flowing through one or more network interfaces associated with a service instance during a period of time in order to determine a status of the service instance.

In some embodiments, the status of a service or service instance is transmitted to a health check engine in the DNS server in order to update a classification of an association between a host name and a network address in a data structure (e.g., a table, an array, etc.) maintained by the DNS server. According to some embodiments, the status of a service instance can be transmitted to a monitoring agent in a load balancer for the service. In turn, the load balancer can aggregate the status of each of a plurality of service instances to determine an overall status of the service. The status of the service is then transmitted to a health check engine in the DNS server in order to update a classification of the association between the host name and the network address in the data structure.

These and other embodiments will now be discussed below with reference to FIGS. 1-7; however, those skilled in the art will readily appreciate that the detailed description given herein with respect to these figures is for explanatory purposes only and should not be construed as limiting.

FIG. 1 illustrates a block diagram of an example distributed environment 100 that can be configured to implement different aspects of the various techniques described herein, in accordance with some embodiments. As shown in FIG. 1, the distributed environment 100 can include a plurality of services distributed on one or more nodes of a network. As used herein, the term "service" can refer to a process implemented on one or more threads running on a server computing device, where the one or more threads are configured to process requests received via a network interface. In some embodiments, the service can be implemented as a program product stored on a computer readable storage medium including a set of instructions that, when executed by at least one processor of the server computing device, cause the at least one processor to implement particular functionality of the service. In some embodiments, each service can be executed as multiple service instances on one or more nodes of the network in parallel. The one or more nodes can include, but are not limited to, separate server computing devices in different data centers, separate server computing devices in a single data center, separate virtual machines executing on one or more server computing devices in either a single data center or multiple data centers, a single server computing device, and so on.

As shown in FIG. 1, the distributed environment 100 includes a first service 110, Service A, which is associated with multiple service dependencies. According to some embodiments, the first service 110 can be configured to process requests from one or more clients. As used herein, the term "client" refers to a process implemented on one or more threads running on a client computing device that are configured to generate requests transmitted to the service via a network interface. In turn, the first service 110 can transmit additional requests to one or more additional services (associated with the first service 110) in conjunction with processing the requests from the one or more clients. The first service 110 can, therefore, be dependent on the one or more additional services to generate responses to the requests received from the one or more clients by the first service 110. Additionally, a service dependency, as specified for a particular service, can be classified as "critical" if the particular service is unable to generate a valid response without receiving, from the additional service, a response to an additional request issued to the additional service. Other service dependencies can be classified as "non-critical" if a response from an additional service is not required in order to generate the response to the client.

As shown in FIG. 1, the first service 110 includes two service dependencies. In particular, the first service 110 is dependent on a second service 120, Service B, as well as a third service 130, Service C. Additionally, the third service 130 is dependent on a fourth service 140, Service D. During a normal operating mode, the first service 110 is available to process incoming requests from one or more clients, e.g., a first request from a particular client. In processing the first request, the first service 110 generates additional requests to each of the second service 120 and the third service 130. In turn, the third service 130 generates yet another additional request to the fourth service 140. The fourth service 140 returns a response to the third service 130. Upon receipt of the response from the fourth service 140, the third service 130 returns a response to the first service 110. Asynchronously and independent of the operation of the third service 130, the second service 120 also returns a response to the first service 110. In turn, the first service 110 can generate a response to the first request, based on the responses to the additional requests received from the second service 120 and the third service 130, and transmits the response to the first request to the client.

It will be appreciated that, in some embodiments, each service can be configured to process multiple requests substantially simultaneously. For example, the processing of a particular request within the first service 110 can be idle while waiting on a response from either the second service 120 or the third service 130. While the first service 110 is idle, the first service 110 can process additional requests from additional clients. In various embodiments, a service can include a thread pool, where each thread in the thread pool can be assigned to process a different request substantially simultaneously. Processing different requests substantially simultaneously can refer to parallel-processing multiple requests in different threads within a processor that includes multiple identical processing units allocated for multiple threads. Alternatively, processing different requests substantially simultaneously can refer to serially-processing multiple requests in different threads within a processor that can be configured to utilize thread pre-emption in a time division multiplexing mode of operation.

In some embodiments, the requests and responses are structured as hypertext transfer protocol (HTTP) messages. In particular, a client computing device can establish a connection with a server computing device on a particular port of a network interface. In turn, a client on the client computing device can transmit HTTP requests to the server computing device directed to the particular port of the network interface. A service, executing on the server computing device, can be configured to monitor the port for HTTP requests, process the HTTP requests to generate HTTP response messages, and transmit the HTTP response messages back to the client on the client computing device. An HTTP request is structured as one of a plurality of methods including, but not limited to, a GET method, a HEAD method, a POST method, a PUT method, and an OPTION method, among other methods. The HTTP request includes a request line that identifies the method associated with the request and a uniform resource locator (URL). The HTTP request also includes a header including one or more fields and an optional message body. The HTTP response message includes a status line that identifies a status code and a status message. The HTTP response message also includes a header and an optional message body.

In some embodiments, each service instance maintains a status of the service instance and can be configured to respond to health check messages from a health check engine on the network. The status can be based on the status of service dependencies associated with the service instance. For example, the status can require any critical service dependencies to be available in order for the status of the service instance to be positive. In some embodiments, a state of the status of a service instance can be classified as positive or negative (e.g., two states). A positive classification indicates the service is available and a negative classification indicates the service is unavailable. In various embodiments, the status of a service can be classified as any number of different states in addition to or in lieu of the positive state and the negative state. For example, the status can be classified as available or unavailable; the status can be classified as positive, fair, poor, and negative; and so forth. The exemplary states described herein are a design choice and the number and description of the states of a status can be determined by a software developer as long as the status reflects at least two states. As referred to herein, the status of a service or service instance can refer to a health status, an operational status, or any other type of status that represents a state of the service or service instance.

Figure 2:
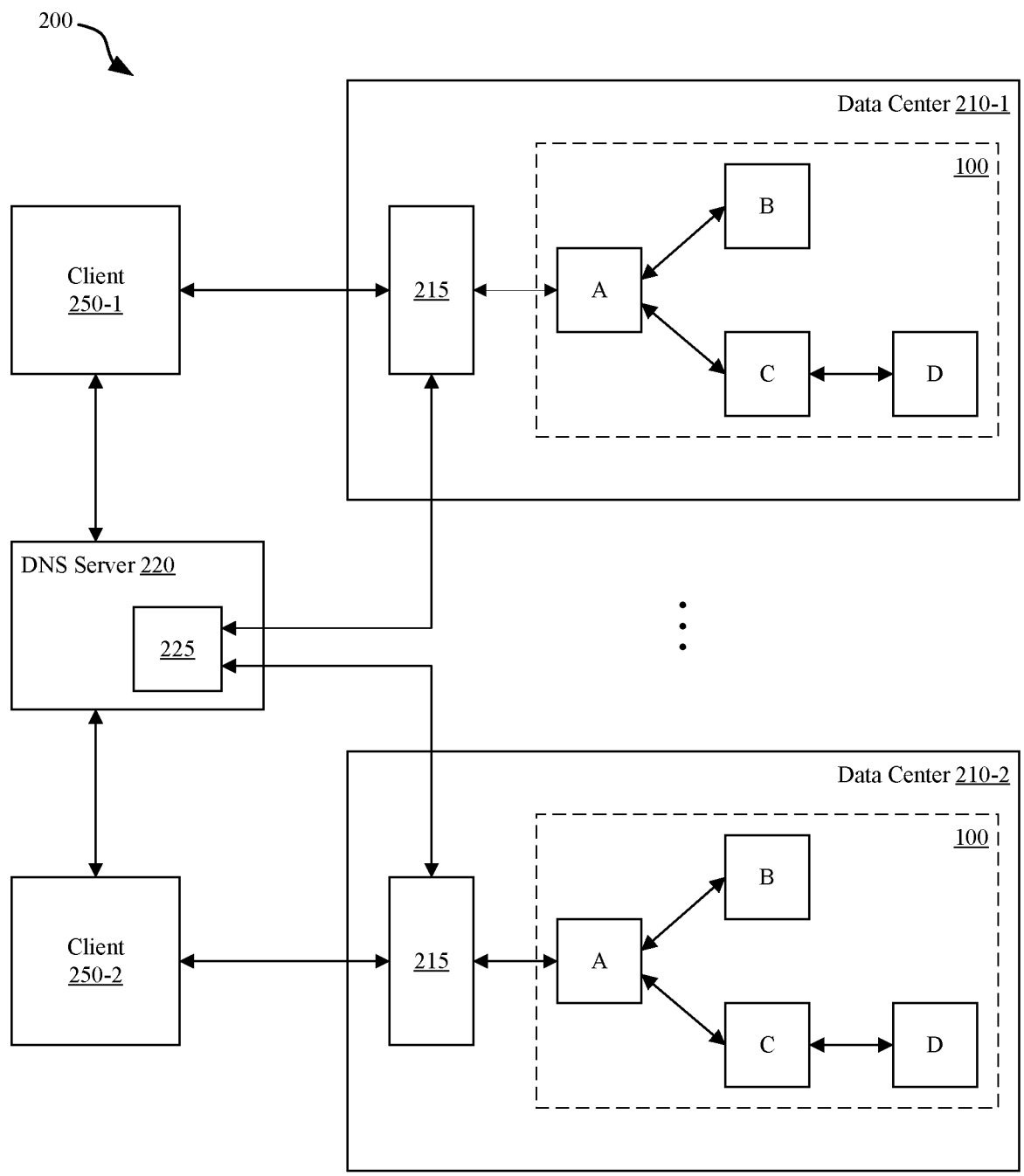
FIG. 2 illustrates a distributed environment that can be implemented to maintain an overall high-availability of services, in accordance with some embodiments.

FIG. 2 illustrates a distributed environment 200 that can be implemented to maintain an overall high-availability of services, in accordance with some embodiments. As previously noted herein, multiple instances of a service (or services) can be implemented on a single server computing device or across multiple server computing devices. In some embodiments, redundant instances of a service can be implemented on different data centers in different geographic locations. For example, as shown in FIG. 2, each data center 210 implements an instance of the distributed environment 100 of FIG. 1. For example, a first instance of Service A can be implemented on a first server computing device in a first data center 210-1, and a second instance of Service A can be implemented on a second server computing device in a second data center 210-2. Different clients 250 can then connect to the different instances of Service A in each of the two data centers 210, thereby establishing redundancy for the provision of Service A.

In some embodiments, each data center in a plurality of different data centers 210 can be configured to process requests originating within a respective availability zone. In this regard, each data center 210 can include a gateway server 215 that includes a network interface associated with a public network address such as an Internet Protocol (IP) address of the Internet. In turn, various clients 250 connected to the network can generate requests for a service that are transmitted over the network. In particular, the requests can include a URL associated with the service. In some cases, the URL can specify a host name rather than the static IP address of a particular gateway server 215 included in a data center 210. In this regard, the client 250 receives a response from a DNS server 220 that effectively translates the URL into an IP address. According to some embodiments, the DNS server 220 includes data structures (e.g., tables, arrays, etc.) that enable the DNS server 220 to translate the host name to an IP address for a corresponding gateway server 215. In various embodiments, the DNS server maintains one or more data structures of associations between host names for one or more services and network addresses corresponding to one or more service instances for the service.

In some embodiments, a particular host name can be translated into two or more different network addresses for different gateway servers located in different data centers. In particular, different DNS servers located in different geographic regions can associate a particular host name with a different network address. For example, a DNS server in North America can resolve a host name as a first network address for a gateway server in a first data center located in North America, and a separate DNS server in Europe can resolve the host name as a second network address for a gateway server in a second data center located in Europe. In particular, clients in North America are configured to use the DNS server in North America and clients in Europe are configured to use the DNS server in Europe, which prevents traffic generated by clients in North America from being sent to a service instance located in Europe and prevents traffic generated by clients in Europe from being sent to a service instance located in North America. This type of redundancy can reduce latency by reducing the number of hops within the network between the client and a particular service instance.

Another type of redundancy can increase the availability of a service by using multiple, redundant service instances within a particular region. Multiple availability zones can be implemented within a single region. As shown in FIG. 2, the first data center 210-1 and the second data center 210-2 can both be located in the same region (e.g., North America, Europe, etc.); however, each data center 210 can represent a different availability zone. A single DNS server 220 can implement round-robin DNS practices to resolve a particular host name as two or more separate and distinct network addresses, thereby achieving a form of load-balancing. In turn, some clients 250 located in a particular region—such as the client 250-1—resolve a host name for a particular service to a network address for the gateway server 215 in a first data center 210-1, while other clients located in the particular region—such as the client 250-2—resolve the host name for the particular service to a network address for the gateway server 215 in a second data center 210-2.

It will be appreciated that an overall high-availability of a service can be achieved by implementing multiple service instances in different data centers in different geographic locations within a region. In this regard, when a particular service instance or data center is down, requests to resolve a host name for the service processed by the DNS server 220 can return one of the network addresses for a different service instance located in a different data center. Thus, traffic for a particular service is only undeliverable when all the service instances for the service in multiple data centers are down, which is uncommon.

In some embodiments, a DNS server 220 can include a health check engine 225 that periodically checks the statuses of services registered with the DNS server 220. According to some embodiments, the health check engine 225 can be configured to periodically transmit health check messages to each of the registered services. As previously noted herein, a service can be registered with the DNS server 220 by associating a host name for the service with one or more network addresses. In this regard, the health check engine 225 can send a health check message to a service instance at each registered network address. The service instance that receives the health check message can then respond to the health check message with a status included in a response to the health check message. In various embodiments, the status is associated with a status code. For example, a status code that reflects the status of the service instance can be selected as an HTTP status code such as "200 Okay" when the status of the service instance is positive, or "503 Service Unavailable" when the status of the service instance is negative. Alternatively, the status code can be a custom status code that reflects a state (e.g., available/unavailable; positive/fair/poor/negative; etc.) of the status. Optionally, the status can include a status message in addition to the status code. If the service instance is functioning properly, then the status can indicate that the service instance is available. However, if the service instance is not functioning properly, then the status can indicate that the service instance is unavailable. When the health check engine 225 receives a response to the health check message that a service instance is unavailable, then the association between the host name and the network address associated with that service instance can be removed from a data structure in the DNS server 220 so that any new requests to resolve the host name are responded to with one of the other network addresses associated with the host name.

In some embodiments, when the health check message indicates that a service instance is unavailable, a classification of the association between the host name and network address for the service instance is marked as unavailable, rather than removed from the data structure in the DNS server 220. In this manner, the DNS server 220 does not resolve the host name to the network address corresponding to that service instance. In such embodiments, the health check engine 225 can be configured to periodically transmit a health check message to the service instance at that network address to check if the service instance is functioning properly after a delay. If the status of the service instance indicates the service instance is available, then the classification of the association between the host name and network address for the service instance is marked as available, and the DNS server 220 is permitted to resolve the host name for the service with the network address corresponding to that particular service instance.

In a naïve implementation of the health check engine 225, the health check message is a basic HTTP request transmitted to the service instance, and the service instance returns an HTTP response message including, for example, a status code 2XX (e.g., status code "200 OK") when the service instance is available, and a status code 4XX or 5XX (e.g., status code "404 Not Found," status code "503 Service Unavailable," etc.) when the service instance is unavailable. The association can also be marked as unavailable when the server computing device does not return any HTTP response messages after a timeout period. For example, a particular service instance in data center 210-1 may not return an HTTP response message to the HTTP request if the gateway server 215 experiences a failure and cannot forward the HTTP request to the service instance. However, this naïve implementation does not explicitly track service dependencies for the service instance. The naïve implementation of the health check engine 225 also does not determine the status of a service instance based on a status of each of the service dependencies for the service instance. Consequently, an improved technique for implementing a health check for a service is desired, and is described herein.

In various embodiments, the health check engine 225 can be implemented on a separate server computing device connected to the DNS server 220. The health check engine 225 monitors the status of services and transmits messages to the DNS server 220 in order to remove, or change the classification of, the associations within the data structures of the DNS server 220. In other embodiments, the health check engine 225 can be implemented for a purpose entirely unrelated to DNS. For example, the health check engine 225 could be configured to monitor the status of services for the purposes of dynamically changing a configuration of a web-based application. It will be appreciated that the functionality of the health check engine 225 can be implemented for any valid purpose related to the analysis of the status of one or more services.

Figure 3:
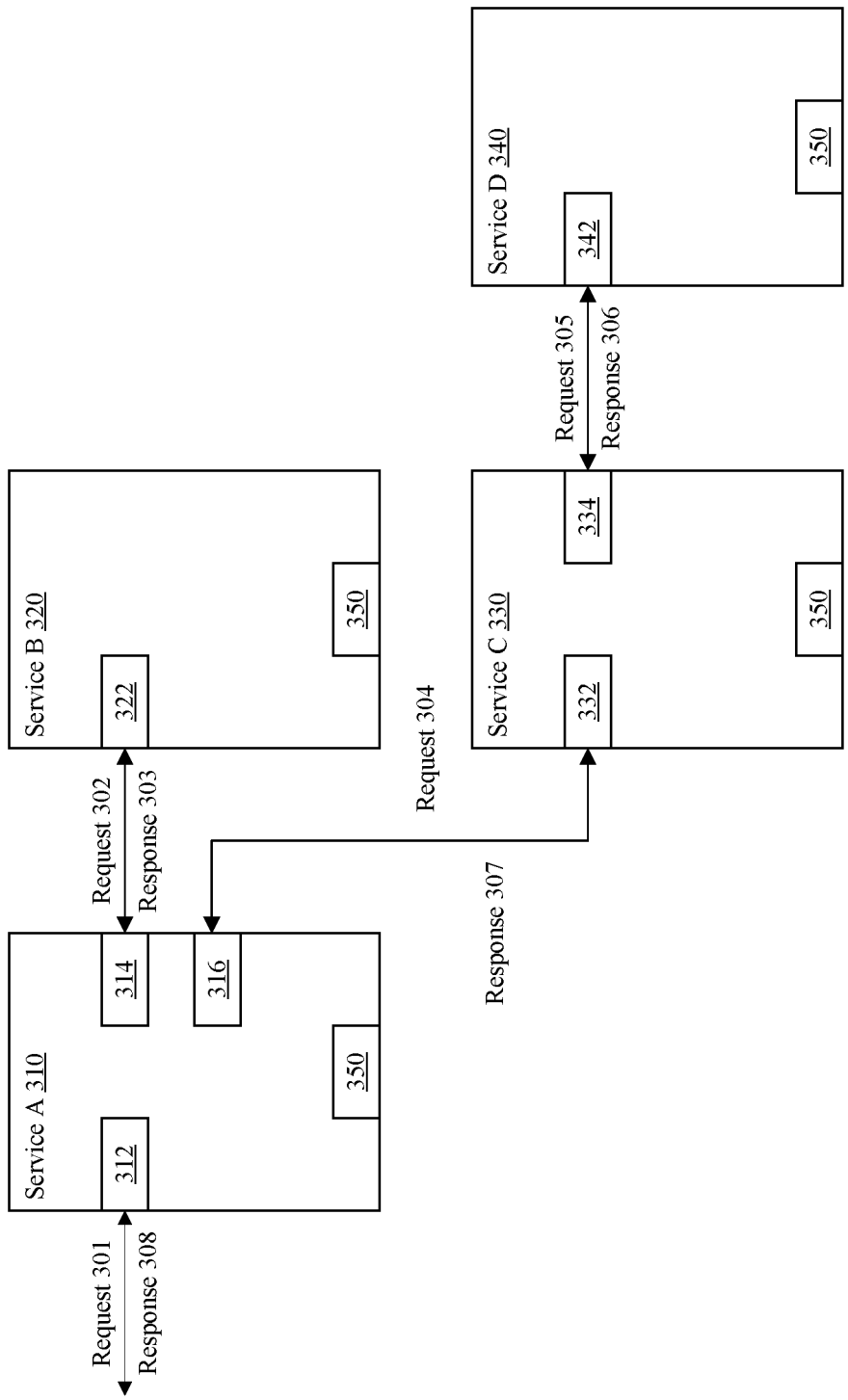
FIG. 3 illustrates messages transmitted between a service instance and one or more service dependencies, in accordance with some embodiments.

FIG. 3 illustrates messages transmitted between a service instance and one or more service dependencies, in accordance with some embodiments. As shown in FIG. 3, a first service instance 310 for Service A receives a request 301 at a network interface 312. As used herein, a network interface, such as network interface 312, refers to a network address and port number allocated by the server computer device to the service instance for receiving data from or transmitting data to other computing devices. The first service instance 310 for Service A allocates a thread to process the request 301. During the processing of the request 301, the thread generates an additional request 302 associated with a first service dependency of Service A. The additional request 302 is transmitted from a network interface 314 to a first service instance 320 for Service B. Additionally, processing the request 301 can involve the thread generating an additional request 304 associated with a second service dependency of Service A. The additional request 304 is transmitted from a network interface 316 to a first service instance 330 for Service C.

As shown in FIG. 3, the first service instance 320 for Service B receives the additional request 302 at a network interface 322. The first service instance 320 for Service B can allocate a thread to process the additional request 302. The first service instance 320 for Service B then generates a response 303 and transmits the response to the first service instance 310 for Service A over the network interface 322. Additionally, the first service instance 330 for Service C receives the additional request 304 at a network interface 332. The first service instance 330 for Service C allocates a thread to process the additional request 304. During the processing of the request 304, the thread generates an additional request 305 associated with a service dependency of Service C. The additional request 305 is transmitted from a network interface 334 to a first service instance 340 for Service D.

The first service instance 340 for Service D receives the additional request 305 at a network interface 342. The first service instance 340 for Service D can allocate a thread to process the additional request 305. The first service instance 340 for Service D generates a response 306 and transmits the response to the first service instance 330 for Service C using the network interface 342. After receiving the response 306 from the first service instance 340 for Service D at network interface 334, the first service instance 330 for Service C generates a response 307 and transmits the response 307 to the first service instance 310 for Service A over network interface 322. In turn, after receiving the response 303 from the first service instance 320 for Service B at network interface 314 and receiving the response 307 from the first service instance 330 for Service C at network interface 316, the first service instance 310 for Service A generates a response 308 and transmits the response 308 to the client over network interface 312. It will be appreciated that the order in which the additional requests 302/304 are transmitted can be dependent on the order of instructions within the thread. Furthermore, the order in which the responses 303/307 are received by the first service instance 310 for Service A can be out of order with respect to the order that corresponding request 302 and request 304 were transmitted to corresponding first service instance 320 for Service B and first service instance 330 for Service C, respectively.

In some embodiments, each service instance includes a monitoring agent 350 configured to respond to health check messages, such as the health check messages generated by a health check engine 225 in DNS server 220. The monitoring agent 350 maintains a status of the service instance and generates a response to health check messages that includes a status code that reflects the status of the service instance. According to some embodiments, the status code indicates whether the service instance is functioning normally and responding to requests from clients. The status of the service instance can also reflect the status of service dependencies. For example, even though the service instance is available and functioning properly, the service instance can fail to respond to requests due to one or more service dependencies experiencing a failure state.

In some embodiments, the monitoring agent 350 monitors traffic on a network interface, allocated to the service instance, which is associated with a service dependency. In particular, the monitoring agent 350 can be configured to track a number of additional requests generated by the service instance and transmitted to a service instance associated with the service dependency over the network interface. The monitoring agent 350 also can be configured to calculate a ratio of successful responses to failed responses received in response to the additional requests transmitted to the service instance associated with the service dependency. The number of requests and the ratio of successful responses to failed responses can be tracked for a period of time, which is referred to herein as a "tracking window." In this regard, the status of the service instance can be determined based on the number of requests and the ratio of successful responses to failed responses. In various embodiments, the status of the service instance is determined by comparing the ratio of successful responses to failed responses for a service dependency to a threshold value. For example, the status of the service instance can be positive (e.g., the service instance is available) if the ratio of successful responses to failed responses for a service dependency is above the threshold value (e.g., 10:1, 5:1, etc.). Conversely, the status of the service instance can be negative (e.g., the service instance is unavailable) if the ratio of successful responses to failed responses for a service dependency is below the threshold value.

The status of the service instance can be determined by the monitoring agent 350 at the end of each tracking window. In various embodiments, the status of the service instance at the end of a tracking window remains the same as the status of the service instance at the end of a previous tracking window, regardless of the ratio of successful responses to failed responses, if the number of additional requests transmitted to the service dependency during the tracking window is below a second threshold value. In other words, the ratio may not accurately reflect a status of a service dependency when the number of additional requests sent during a tracking window is too small.

In some embodiments, the status of the service instance is determined by comparing a plurality of ratios of successful responses to failed responses for a corresponding plurality of service dependencies to a threshold value. If any ratio of successful responses to failed responses for one of the corresponding plurality of service dependencies is below the threshold value, then the status of the service instance can be classified as negative. Otherwise, if all ratios of successful responses to failed responses for the corresponding plurality of service dependencies are above the threshold value, then the status of the service instance can be classified as positive.

For example, as shown in FIG. 3, a monitoring agent 350 in the first service instance 310 for Service A can monitor requests 302 transmitted over network interface 314 and calculate a first ratio of successful responses 303 to failed responses 303 received at the network interface 314 during the tracking window. Similarly, the monitoring agent 350 in the first service instance 310 for Service A can monitor requests 304 transmitted over network interface 316 and calculate a second ratio of successful responses 307 to failed responses 307 received at the network interface 316 during the tracking window. The status of the first service instance 310 for Service A at the end of the tracking window can be classified as positive if both the first ratio and the second ratio are above a threshold value. Conversely, the status of the first service instance 310 for Service A at the end of the tracking window can be classified as negative if either the first ratio or the second ratio are below the threshold value, so long as the particular ratio below the threshold value is generated based on a number of additional requests that is above a second threshold value.

In some embodiments, the status is determined by comparing, to a threshold value, a ratio of successful responses to failed responses generated by the service instance. In other words, the service instance tracks the responses generated and transmitted to a plurality of clients within a tracking window. Contrary to tracking the number of requests transmitted to service dependencies and the corresponding responses received from service dependencies, the monitoring agent 350 can track the responses transmitted to clients as a result of processing requests received from clients. In particular, each request received from a client can cause the service instance to generate a number of additional requests to service dependencies, which must be tracked individually. However, each request from a particular client corresponds to only a single response generated by the service instance for the particular client, so the monitoring agent 350 is only tasked with counting requests and/or corresponding responses associated with a single network interface in order to monitor the status of the service instance. In this regard, the status accurately reflects the availability of critical service dependencies, as a downstream failure of any critical service dependency can result in a failed response generated by the service instance and transmitted to the particular client.

For example, as shown in FIG. 3, a monitoring agent 350 in the first service instance 310 for Service A monitors responses 308 transmitted over network interface 312 and calculates a ratio of successful responses 308 to failed responses 308 transmitted over the network interface 312 during the tracking window. The status of the first service instance 310 for Service A at the end of the tracking window can be classified as positive if the ratio is above a threshold value. Conversely, the status of the first service instance 310 for Service A at the end of the tracking window can be classified as negative if the ratio is below the threshold value, so long as the ratio below the threshold value is generated based on a number of requests 301 received during the tracking window that is above a second threshold value.

The choice of whether to monitor additional requests transmitted to service dependencies and track the ratio of successful responses to failed responses received from each service dependency—or to monitor responses transmitted to clients—is a design choice that can be implemented by a software developer. However, it is noted that the former technique can improve precision given that the monitoring agent 350 tracks each dependency separately on a different network interface. In comparison, the latter technique degrades precision given that the monitoring agent 350 only tracks responses transmitted via a single network interface.

In some embodiments, a status message can be included in a response that indicates specific dependencies that are down when the status of a service instance is classified as negative. According to some embodiments, the status message can include the ratio of successful responses to failed responses collected by the monitoring agent 350 during the previous tracking window for one or more service dependencies. In addition, the status message can indicate a particular reason for which the service instance is down. For example, each thread processing a request can include instructions that cause the thread to transmit an error message to the monitoring agent 350 when the thread experiences a critical failure. In turn, the monitoring agent 350 can collect statistics related to any failures collected from the thread pool during a tracking window. The monitoring agent 350 can then report these statistics in a status message—or, alternatively, in a message body included in the response.

In some embodiments, a service instance can include a reference (e.g., in its source code) to a library for collecting statistics related to a particular network interface. For example, the source code for the monitoring agent 350 can utilize calls to the library to collect statistics during the tracking window. In various embodiments, the library can collect statistics for a period of time that is smaller than the tracking window. In turn, the monitoring agent 350 can be configured to frequently collect statistics during the tracking window by utilizing calls to library functions. The monitoring agent 350 can then aggregate the collected statistics over the duration of the tracking window. Utilization of intermediate libraries for collecting statistics on network traffic can reduce the time required for a software developer to write source code for a service utilizing a variably-sized tracking window selected by the software developer. Alternatively, the library can enable a software developer to specify the size of the tracking window (e.g., in milliseconds) when utilizing a constructor of a library method.

It will be appreciated that having large numbers of clients generating requests to a single service instance in a data center can quickly overwhelm the service instance. In particular, and under such a scenario, the service instance can fail to respond to all client requests. In practice, many service instances are typically deployed in a particular data center, where each service instance handles requests from a plurality of clients. Thus, each service of multiple services included in a data center can be associated with a plurality of service instances. Such deployments complicate the implementation of a health status monitoring system. For example, when a health check message is transmitted to a network address associated with a service in the data structure of the DNS server 220, the health check message can be forwarded to a particular service instance provisioned at the network address. However, if the network address is associated with a large number of service instances for the service, the health check message could be forwarded to a particular service instance and the status of that particular service instance could not accurately reflect the status of the service at that network address (e.g., where a small number of service instances are experiencing failures but a large number of service instances are functioning properly). Consequently, a more robust technique for implementing a health status monitoring system is desirable.

Figure 4:
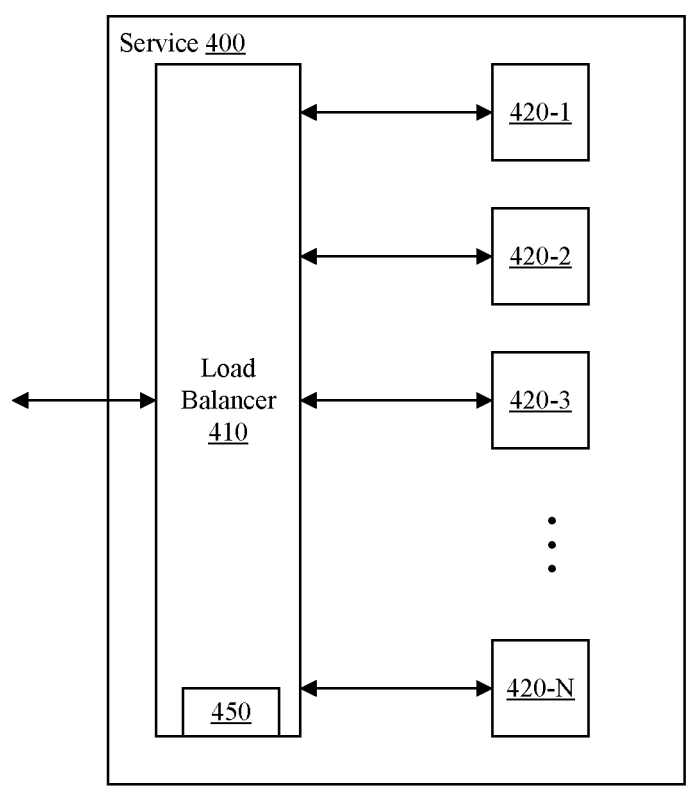
FIG. 4 illustrates a service that includes a number of service instances, in accordance with some embodiments.

FIG. 4 illustrates a service 400 that includes a number of service instances 420, in accordance with some embodiments. As shown in FIG. 4, the service 400 includes N service instances 420, where each service instance 420 can be executed on a server computing device. Alternatively, in some embodiments, multiple server instances 420 can be deployed on a single server computing device, where each server instance 420 is executed within a virtual machine on the server computing device. A hypervisor or virtual machine monitor can also be executed on the server computing device and be configured to provision virtual machines for server instances. The hypervisor or virtual machine monitor can also be configured to schedule allocation of hardware resources to each of the virtual machines so that threads included in the service instances 420 are allowed time to run utilizing the hardware of the server computing device.

The service 400 also includes a load balancer 410. The load balancer 410 can be executed on a server computing device, which can be separate from the server computing devices that host one or more service instances 420. Requests from clients can be received by the load balancer 410, where, in turn, the load balancer 410 distributes the requests to particular service instances 420 in the pool of N service instances 420. In various embodiments, the load balancer 410 can utilize round-robin scheduling to distribute requests to different service instances 420. Alternatively, the load balancer 410 can utilize a more complex scheduling algorithm that tracks a number of pending requests being processed by each service instance 420. The load balancer 410 can then attempt to evenly distribute the requests among the available pool of service instances 420. Of course, other algorithms for performing load balancing are within the scope of the described load balancer 410.

As previously noted herein, when a health check message is transmitted from a health check engine 225 to a service that is implemented using a single service instance, then the status of the single service instance accurately reflects the status of the service. However, when the service is implemented using multiple service instances in a distributed environment—e.g., one with at least two service instances deployed behind a gateway server 215 within a single data center 210—then a status of a particular service instance may not accurately reflect the status of the service.

For example, as shown in FIG. 4, a first service instance 420-1 and a second service instance 420-2 can be down (e.g., unavailable), while a third service instance 420-3 can be up (e.g., available). A health check message transmitted from a health check engine 225 to the service 400 can be forwarded to one of the service instances 420 in the pool of service instances by the load balancer 410. That service instance 420, or more specifically the monitoring agent 350 within the service instance 420, generates a response to the health check request and transmits the response back to the health check engine 225 through the load balancer 410. The status of the service 400 indicated in the response will reflect the status of the particular service instance 420 that received the health check message. Thus, the status of the particular service instance 420 may not accurately reflect the status of the service 400.

As previously set forth here, a naïve implementation of the health check engine 225 can involve a single health check message being transmitted to a service 400 by the health check engine 225. The response to the health check message reflects the status of a single service instance 420 associated with the service, and the health check engine 225 can reclassify the association of the host name for the service with the network address for the gateway server 215 for the data center 210 as unavailable. It will be appreciated that this type of implementation typically is inefficient and can lead to considerable amounts of downtime for a service even when only a small number of service instances are experiencing failures.

In some embodiments, the health check engine 225 can be configured to send a number of health check messages to a service located at a particular network address. Statistics related to the status of service instances 420 returned in the responses to the health check messages are collected by the health check engine 225. The health check engine 225 calculates a ratio of a number of service instances 420 returning responses that indicate the service instance 420 has a positive status to a number of service instances 420 returning responses that indicate the service instance 420 has a negative status. This ratio reflects, approximately, how many service instances 420 for the service 400 are available versus unavailable, and the ratio can be compared to a threshold value by the health check engine 225 to determine whether to remove an association from a data structure in the DNS server 220 or whether to mark the association as unavailable. It will be appreciated that the responses received by the health check engine 225 are not ensured to be returned from separate and distinct service instances 420 because the load balancer 410 could send multiple health check messages to the same service instance 420. Furthermore, the number of health check messages can provide a status of only a sample of the service instances 420 implemented for the service 400. The sample could skew away from the mean status of all service instances 420 depending on the particular sample taken. Thus, a technique to ensure the health check engine 225 receives an accurate assessment of the status of a service 400 including multiple service instances 420 is desired.

In some embodiments, the health check engine 225 transmits a health check message to the service 400. The load balancer 410 receives the health check message. Instead of forwarding the health check message to a single service instance 420, the load balancer 410 forwards the health check message to a plurality of service instances 420. In various embodiments, the load balancer 410 forwards the health check message to each service instance 420 implemented by the service 400. Alternatively, the load balancer 410 forwards the health check message to a statistically relevant sample of the service instances 420 implemented by the service 400. Each service instance 420 receiving the health check message generates a response that is transmitted back to the health check engine 225. Consequently, the health check engine 225 can accumulate the responses into a count of a number of service instances 420 having a positive status and a number of service instances 420 having a negative status in order to calculate a ratio that can be compared to a threshold value by the health check engine 225. The result of the comparison can be utilized to determine whether to remove an association from a data structure in the DNS server 220 or whether to mark the association as unavailable. However, these embodiments require the health check engine 225 to be prepared to process an unknown number of responses from an unknown number of service instances 420 in response to transmitting a single health check message to a service 400. This can complicate the implementation details of the health check engine 225.

In some embodiments, the load balancer 410 includes a monitoring agent 450. The monitoring agent 450 in the load balancer 410 maintains a status of the service 400 that incorporates the status of the plurality of service instances 420. The monitoring agent 450 tracks requests forwarded to each service instance 420 and monitors responses received from the service instances 420 to those requests. The status of the service 400 is determined based on the number of requests forwarded by the load balancer 410 during a tracking window and the ratio of successful responses to failed responses received by the load balancer 410 from service instances 420 during the tracking window. In various embodiments, the status of the service 400 is determined by comparing the ratio of successful responses to failed responses to a threshold value. For example, the status of the service 400 is positive (e.g., the service is available) if the ratio of successful responses to failed responses is above the threshold value; however, the status of the service 400 is negative (e.g., the service is unavailable) if the ratio of successful responses to failed responses is below the threshold value. In various embodiments, the status of the service 400 at the end of a tracking window remains the same as the status of the service 400 at the end of a previous tracking window, regardless of the ratio of successful responses to failed responses, if the number of requests forwarded by the load balancer 410 during the tracking window is below a second threshold value.

In some embodiments, the monitoring agent 450 in the load balancer 410 does not track normal requests and responses during a tracking window in order to monitor a status of the service 400. Instead, the monitoring agent 450 can be configured to aggregate responses from a plurality of service instances 420 to a health check message forwarded by the load balancer 410 to the plurality of service instances 420. More specifically, the health check engine 225 can be configured to transmit a health check message to the service 400. The load balancer 410 receives the health check message and forwards the health check message to a plurality of service instances 420 implemented by the service 400. The load balancer 410 intercepts the responses to the health check message from the plurality of service instances 420 and aggregates the responses into a single response that is transmitted back to the health check engine 225. Aggregating the responses refers to tracking a number of service instances 420 having a positive status and a number of service instances 420 having a negative status by processing the responses received from the plurality of service instances 420. A ratio is calculated based on the number of service instances 420 having a positive status and the number of service instances 420 having a negative status, and the ratio is compared to a threshold value to determine the status of the service 400. The monitoring agent 450 generates a response transmitted to the health check engine 225 that indicates the status of the service 400 as reflected by, e.g., the status code included in the response.

In some embodiments, the load balancer 410 tracks the status of each service instance 420 implemented by the service 400. When the load balancer 410 receives a response to a health check message from a service instance 420, the load balancer 410 can mark that service instance 420 as available or unavailable. In turn, the load balancer 410 does not forward normal requests to any service instances 420 marked as unavailable. However, health check messages received from a health check engine 225 are forwarded to all service instances 420, both service instances 420 marked as available and service instances 420 marked as unavailable. The status of the service instance 420 received in the response to the health check message can be utilized to change the classification of a service instance 420 from available to unavailable or, conversely, from unavailable to available. In effect, a health check message issued by the health check engine 225 enables the load balancer 410 to bring previously unavailable service instances 420 back online if the issues that contributed to the negative status of the service instance 420 have been corrected.

In some embodiments, the monitoring agent 450 does not forward health check messages to the service instances 420. Instead, a monitoring agent 350 included in a service instance 420 can be configured to send a health status update message to the monitoring agent 450 in the load balancer 410 in response to a change in status within the service instance 420. In turn, the load balancer 410 maintains a data structure including the status of each service instance 420 implemented by the service 400. In response to receiving a health status message from the health check engine 225, the monitoring agent 450 checks the data structure to calculate a ratio of service instances 420 having a status classified as positive to service instance 420 having a status classified as negative. The ratio is compared to a threshold value to determine a status of the service 400. In various embodiments, the ratio is calculated each time the monitoring agent 450 receives a health status update message from a service instance 420 rather than calculating the ratio in response to receiving a health check message from the health check engine 225, which can reduce the latency in responding to a health check message from the health check engine 225.

In some embodiments, a DNS server 220 can be configured to reclassify an association as available or unavailable in a data structure in the DNS server 220 in response to receiving a response to a health check message from the monitoring agent 450. However, once an association is marked as unavailable, it is desired to provide an efficient mechanism for reclassifying the association in the data structure when a status of a service 400 transitions from negative to positive. In some embodiments, the health check engine 225 in the DNS server 220 can be configured to periodically poll any service 400 corresponding to an association marked as unavailable to check the status of the service 400 corresponding to the association. The health check engine 225 transmits a health check message to the service 400 periodically until the response received from the load balancer 410 indicates the status of the service 400 is positive. In response, the health check engine 225 marks the association as available in the data structure of the DNS server 220.

Alternatively, in some embodiments, the health check engine 225 transmits an update request message to a monitoring agent 450 in response to receiving an indication from the monitoring agent 450, in a response to a health check message, that the status of the service 400 is classified as negative. The update request message causes the monitoring agent 450 to monitor the status of the service 400 and transmit an update response message to the health check engine 225 when the status of the service 400 transitions from negative to positive. For example, the status of the service 400 can transition from negative to positive when the service 400 adds additional service instances 420, thereby changing the ratio compared against the threshold value to determine the status. The status of the service 400 can also transition from negative to positive when service dependencies become available such that service instances 420 begin receiving a better ratio of successful responses to failed responses from the service dependencies. By proactively transmitting an update response message to the health check engine 225, the DNS server 220 can bring the service 400 back online more quickly that in conventional approaches using round robin DNS.

Figure 5:
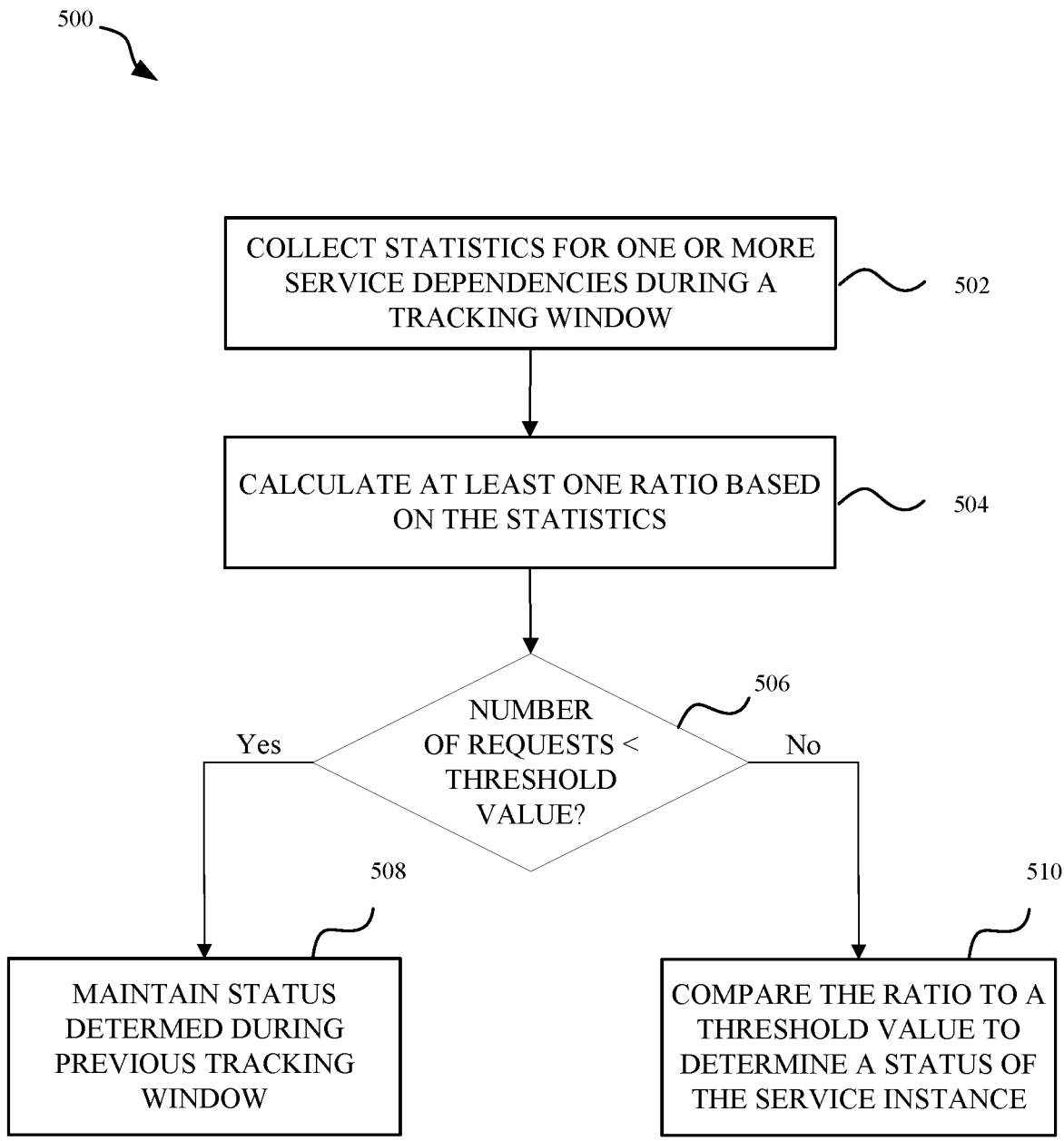
FIG. 5 illustrates a flowchart of an exemplary method for monitoring a status of a service instance, in accordance with some embodiments.

FIG. 5 illustrates a flowchart of an exemplary method 500 for monitoring a status of a service instance, in accordance with some embodiments. The method 500 can be performed by hardware, software executed by a processor, or any combination of hardware and software. In some embodiments, the method 500 can be implemented by the monitoring agent 350 described herein.

At step 502, statistics associated with one or more services dependencies are collected during a tracking window. In some embodiments, a monitoring agent 350 included within a service instance can be configured to track a number of requests transmitted to a service dependency over a network interface. The monitoring agent 350 can also be configured to track a number of successful responses and a number of failed responses received from the service dependency during the tracking window. In various embodiments, successful responses can be represented in HTTP response messages that include a 2XX status code, and failed responses can be represented in HTTP response messages that include a 4XX or a 5XX status code.

At step 504, at least one ratio is calculated based on the statistics collected during the tracking window. In some embodiments, a ratio is calculated for each service dependency based on the responses to a number of additional requests received at a network interface for a particular service dependency. In some embodiments, a ratio is calculated based on a number of responses generated by the service instance. Each response generated by the service instance is successful only if each of the responses associated with a service dependency are also successful. Thus, the number of failed responses generated by the service instance incorporates responses that failed due to any one or more service dependency.

At step 506, a number of requests is compared to a threshold value. The ratio calculated at step 504 is useful when the total sample size of responses is a statistically significant value. Consequently, the status is determined based on the ratio of successful responses to failed responses when the number of requests corresponding to the responses received during the tracking window is greater than a threshold value. In some embodiments, a number of additional requests transmitted to each service dependency is compared to a threshold value. If the number of additional requests is less than the threshold value for any of the service dependencies, then the method 500 proceeds to step 508. However, if the number of additional requests is greater than or equal to the threshold value for all service dependencies, then the method 500 proceeds to step 510.

In some embodiments, a number of requests received by the service instance from one or more clients is compared to a threshold value. Each request received by the service instance corresponds to a response generated by the service instance. In addition, one or more additional requests can be generated by the service instance and transmitted to one or more service dependencies. If the number of requests received by the service instance is less than the threshold value, then the method 500 proceeds to step 508. However, if the number of requests is greater than or equal to the threshold value, then the method 500 proceeds to step 510.

At step 508, when the number of requests is less than the threshold value, a status of the service instance determined during a previous tracking window is maintained. When the number of requests is less than the threshold value, then the status as indicated by the ratio is not statistically meaningful. Therefore, the ratio is ignored during the tracking period and the status of the service instance is maintained as the same status as determined during the previous tracking period. The method 500 can be repeated during a new tracking window.

At step 510, when the number of requests is greater than the threshold value, a status of the service instance is determined by comparing the at least one ratio to a threshold value. In some embodiments, the status is determined by comparing each ratio of successful responses to failed responses for one or more service dependencies to a threshold value. If a ratio for one or more service dependencies is below the threshold value, then the status of the service instance is classified as negative (e.g., the service instance is unavailable); however, if the ratio(s) for one or more service dependencies are above the threshold value, then the status of the service instance is classified as positive (e.g., the service instance is available). In some embodiments, the status is determined by comparing a ratio of successful responses to failed responses generated by the service instance to a threshold value. If the ratio is below the threshold value, then the status of the service instance is classified as negative (e.g., the service instance is unavailable); however, if the ratio is above the threshold value, then the status of the service instance is classified as positive (e.g., the service instance is available). The method 500 can be repeated during a new tracking window.

In some embodiments, the method 500 is implemented within a monitoring agent 350 of a service instance. The method 500 can be repeated during each new tracking window to update the status of the service instance with a frequency dependent on the length of the tracking window. Exemplary embodiments can utilize tracking windows between one second and sixty seconds depending on the expected traffic for the service, although tracking windows less than one second or greater than sixty seconds are contemplated as being within the scope of this detailed description of the monitoring agent 350.

Figure 6:
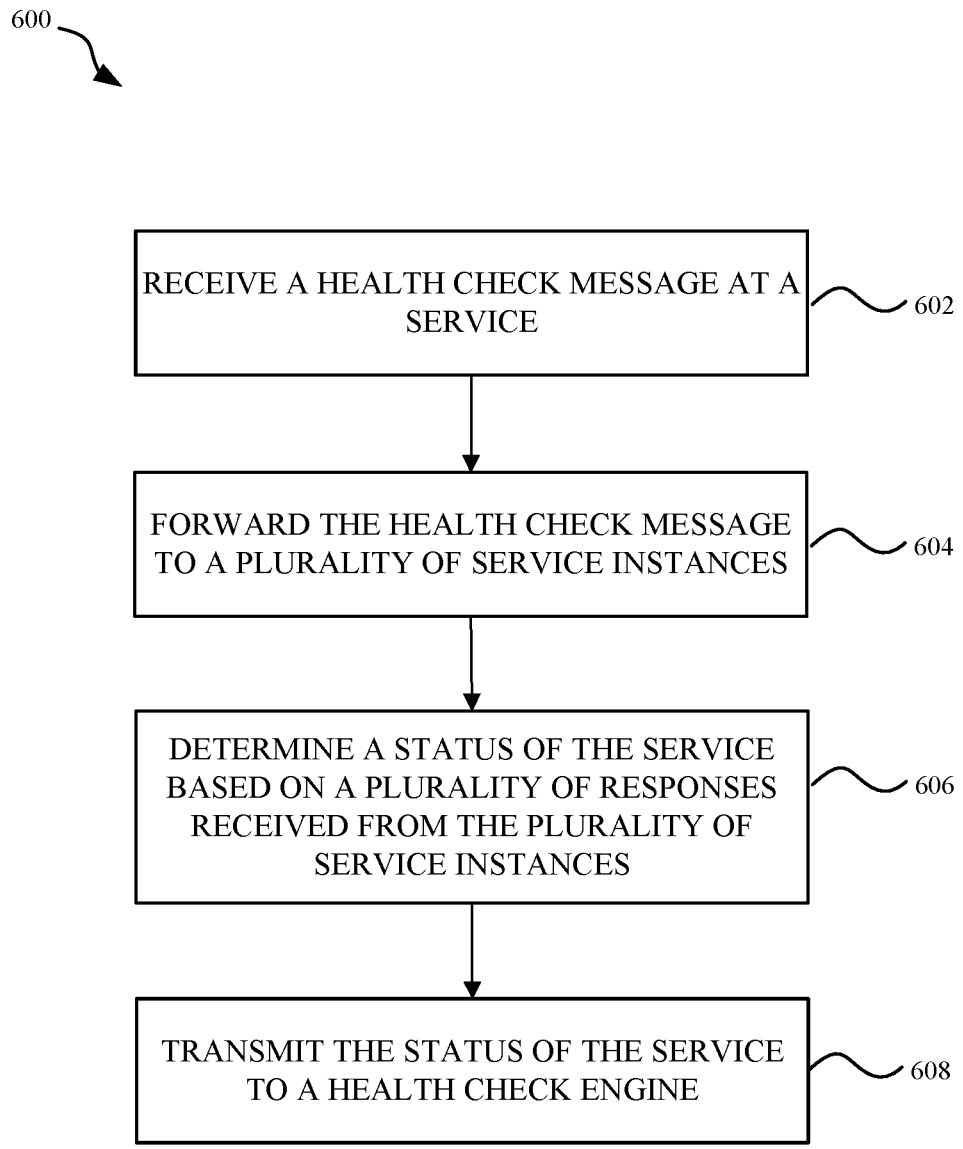
FIG. 6 illustrates a flowchart of an exemplary method for monitoring a status of a service that includes a plurality of distributed service instances, in accordance with some embodiments.

FIG. 6 illustrates a flowchart of an exemplary method 600 for monitoring a status of a service that includes a plurality of distributed service instances, in accordance with some embodiments. The method 600 can be performed by hardware, software executed by a processor, or any combination of hardware and software. In some embodiments, the method 600 can be implemented by the monitoring agent 450 in a load balancer 410 of a front end for the service 400.

At step 602, a health check message is received at a service. The service can include a load balancer and a number of service instances. In some embodiments, the health check message is received from a health check engine 225 included in a DNS server 220. At step 604, the health check message is forwarded to a plurality of service instances. In some embodiments, the load balancer receives the health check message and forwards the health check message to each of the service instances in the plurality of service instances. Each service instance generates a response to the health check message that includes a status of the service instance. In various embodiments, the status of each service instance is generated according to the method 500 described above in conjunction with FIG. 5.

At step 606, a status of the service is determined based on the responses received from the plurality of service instances. Each service instance generates a response that indicates the status of the service instance. Each service instance transmits a corresponding response to the load balancer. In some embodiments, the load balancer intercepts the responses from the plurality of service instances and aggregates the responses into a single response that is transmitted back to the health check engine, where the single response indicates the status of the service.

At step 608, the status of the service is transmitted to the health check engine. In some embodiments, the load balancer transmits the status of the service to the health check engine in a response to the health check message received by the load balancer. The health check engine can be configured to process the response and adjust a classification of an association between a host name for the service and a network address associated with the service based on the status of the service.

It will be appreciated that, in some embodiments, the operation at step 606 can be implemented in the health check engine 225 of the DNS server 220 rather than in a load balancer for the service. In such embodiments, the load balancer forwards a response to the health check message received from each of the service instances to the health check engine 225. The health check engine 225 can be configured to aggregate the responses and determine a status of the service based on the status of each service instance received in the plurality of responses. In such embodiments, the operation at step 608 can be omitted as the load balancer merely acts as a proxy to forward the health check message to the plurality of service instances and to forward the responses from the service instances to the health check engine 225.

It will be appreciated that the status of the service compiled by the load balancer represents the status of the service in a single availability zone associated with a single network address. In various embodiments, a service can be provisioned with additional service instances in different availability zones, the additional service instances associated with an additional load balancer and an additional status of the service. Each status of the service corresponding to a particular monitoring agent in a load balancer corresponds to a particular association of the host name for the service and a particular network address in a data structure of the DNS server 220. Additional associations between the host name for the service and additional network addresses corresponding to additional service instances for the service can be included in the data structure maintained by the DNS server 220, and can be updated by the health check engine 225 by sending additional health check messages to those particular additional network addresses.

Figure 7:
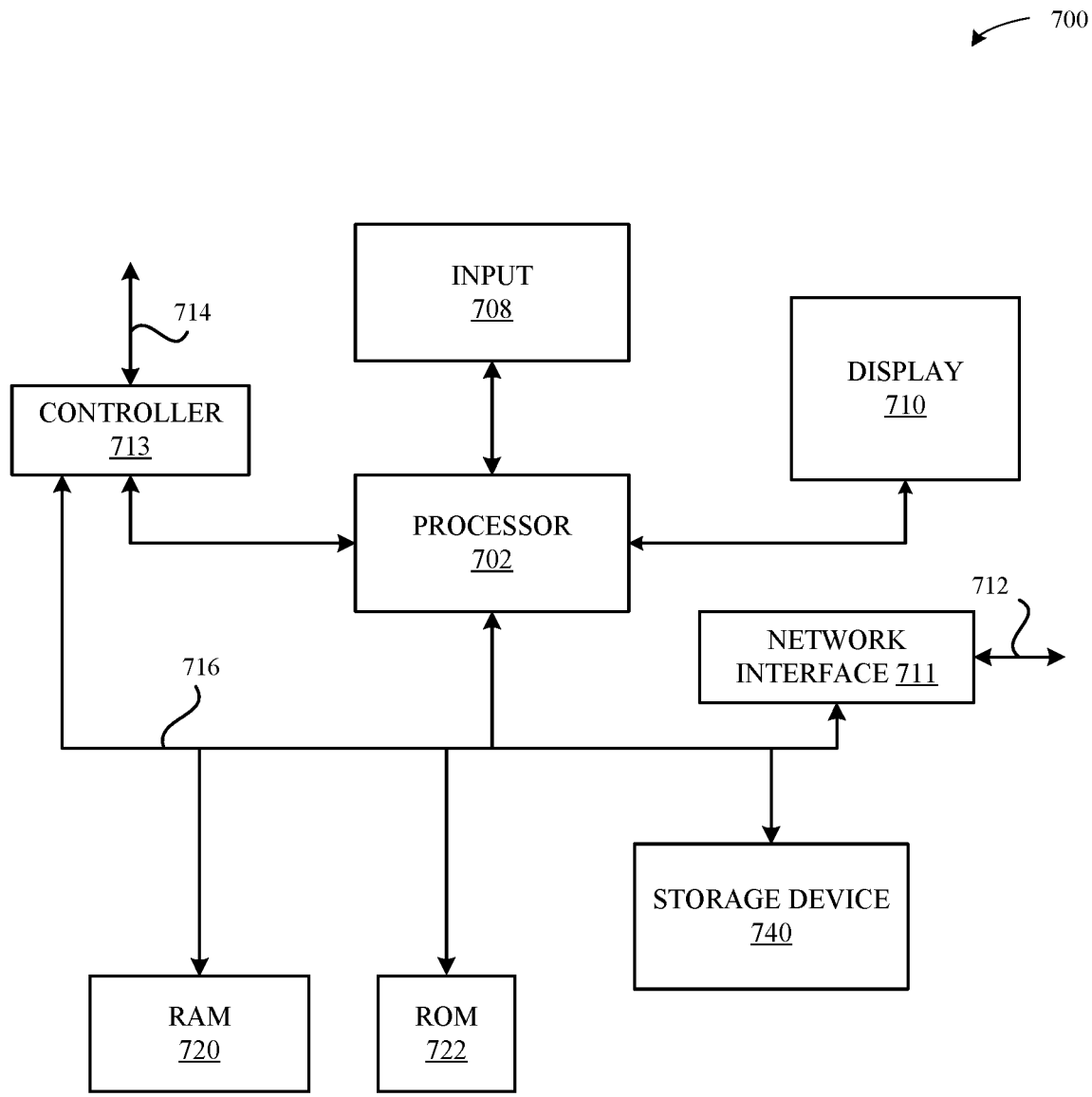
FIG. 7 illustrates a detailed view of an exemplary computing device that can be used to implement the various apparatus and/or methods described herein, in accordance with some embodiments.

FIG. 7 illustrates a detailed view of an exemplary computing device 700 that can be used to implement the various apparatus and/or methods described herein, in accordance with some embodiments. In particular, the detailed view illustrates various components that can be included in the computing devices illustrated in FIGS. 1 to 4 and/or described herein. For example, one or more of the client device(s) 250, gateway server(s) 215, DNS server 220, or any other device including any computing device or server computing device included in a data center 210 can include the components of computing device 700.

As shown in FIG. 7, the computing device 700 can include a processor 702 that represents a microprocessor or controller for controlling the overall operation of computing device 700. The computing device 700 can also include a user input device 708 that allows a user of the computing device 700 to interact with the computing device 700. For example, the user input device 708 can take a variety of forms, such as a button, keypad, dial, touch screen, audio input interface, visual/image capture input interface, input in the form of sensor data, etc. Still further, the computing device 700 can include a display 710 (screen display) that can be controlled by the processor 702 to present visual information to the user. A data bus 716 can facilitate data transfer between at least a storage device 740, the processor 702, and a controller 713. The controller 713 can be used to interface with and control different equipment through an equipment control bus 714. The computing device 700 can also include a network/bus interface 711 that couples to a data link 712. In the case of a wireless connection, the network/bus interface 711 can include a wireless transceiver.

The computing device 700 also include a storage device 740, which can comprise a single disk or a plurality of disks (e.g., hard drives), and includes a storage management module that manages one or more partitions within the storage device 740. In some embodiments, storage device 740 can include flash memory, semiconductor (solid state) memory or the like. The computing device 700 can also include a Random Access Memory (RAM) 720 and a Read-Only Memory (ROM) 722. The ROM 722 can store programs, utilities or processes to be executed in a non-volatile manner. The RAM 720 can provide volatile data storage, and stores instructions related to the operation of the computing device 700.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The non-transitory computer readable medium is any data storage device that can store data which can thereafter be read by a computer system. Examples of the non-transitory computer readable medium include read-only memory, random-access memory, CD-ROMs, HDDs, DVDs, magnetic tape, and optical data storage devices. The non-transitory computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for monitoring a service, the method comprising, at a server computing device that implements a monitoring agent associated with the service:
   receiving a health check message from a health check engine over a network interface;
   issuing, to each service instance of a plurality of service instances of which the service is comprised, a respective request for a respective status of the service instance, wherein the respective status is based at least in part on whether at least one respective downstream service on which the service instance depends is operational;
   generating a status of the service based on the respective statuses provided by the plurality of service instances; and
   transmitting the status of the service to the health check engine.

2. The method of claim 1, wherein the health check engine is included in a Domain Name System (DNS) server.

3. The method of claim 2, wherein the DNS server maintains a data structure of associations between host names for one or more services and network addresses corresponding to one or more service instances for the service.

4. The method of claim 1, wherein, for a given service instance of the plurality of service instances, the respective request causes the given service instance to issue, to the respective downstream service, a second request for an indication of whether the respective downstream service is operational.

5. The method of claim 1, wherein generating the status of the service comprises:
   forwarding the health check message to each service instance of the plurality of service instances;
   receiving, from each service instance of the plurality of service instances, a respective response that includes a respective status of the service instance, wherein the respective status is based at least in part on respective statuses of downstream services on which the service instance depends;
   calculating a ratio based on a number of positive responses and a number of negative responses of the respective responses received from the plurality of service instances; and
   comparing the ratio to a threshold value to determine the status of the service.

6. The method of claim 1, wherein:
   the server computing device implements a load balancer for the service and is communicatively coupled to one or more additional server computing devices, and
   each server computing device of the one or more additional server computing devices executes one or more server instances of the plurality of service instances.

7. The method of claim 1, wherein each service instance of the plurality of service instances includes a respective monitoring agent configured to:
   collect statistics associated with one or more service dependencies of the service instance during a tracking window;
   calculate at least one ratio of successful responses to failed responses received by the service instance during the tracking window; and
   generate a status of the service instance by comparing the at least one ratio to a threshold value.

8. A non-transitory computer readable storage medium configured to store instructions that, when executed by a processor included in a server computing device, cause the server computing device to implement a monitoring agent for monitoring a service, by carrying out steps that include:
   receiving a health check message from a health check engine over a network interface;
   issuing, to each service instance of a plurality of service instances of which the service is comprised, a respective request for a respective status of the service instance, wherein the respective status is based at least in part on whether at least one respective downstream service on which the service instance depends is operational;
   generating a status of the service based on the respective statuses provided by the plurality of service instances; and transmitting the status of the service to the health check engine.

9. The non-transitory computer readable storage medium of claim 8, wherein the health check engine is included in a Domain Name System (DNS) server.

10. The non-transitory computer readable storage medium of claim 9, wherein the DNS server maintains a data structure of associations between host names for one or more services and network addresses corresponding to one or more service instances for the service.

11. The non-transitory computer readable storage medium of claim 8, wherein, for a given service instance of the plurality of service instances, the respective request causes the given service instance to issue, to the respective downstream service, a second request for an indication of whether the respective downstream service is operational.

12. The non-transitory computer readable storage medium of claim 8, wherein generating the status of the service comprises:
   forwarding the health check message to each service instance of the plurality of service instances;
   receiving, from each service instance of the plurality of service instances, a respective response that includes a respective status of the service instance, wherein the respective status is based at least in part on respective statuses of downstream services on which the service instance depends;
   calculating a ratio based on a number of positive responses and a number of negative responses of the respective responses received from the plurality of service instances; and
   comparing the ratio to a threshold value to determine the status of the service.

13. The non-transitory computer readable storage medium of claim 8, wherein:
   the server computing device implements a load balancer for the service and is communicatively coupled to one or more additional server computing devices, and
   each server computing device of the one or more additional server computing devices executes one or more server instances of the plurality of service instances.

14. The non-transitory computer readable storage medium of claim 8, wherein each service instance of the plurality of service instances includes a respective monitoring agent configured to:
   collect statistics associated with one or more service dependencies of the service instance during a tracking window;
   calculate at least one ratio of successful responses to failed responses received by the service instance during the tracking window; and
   generate a status of the service instance by comparing the at least one ratio to a threshold value.

15. A server computing device configured to implement a monitoring agent for monitoring a service, the server computing device comprising a processor configured to cause the server computing device to carry out steps that include:
   receiving a health check message from a health check engine over a network interface;
   issuing, to each service instance of a plurality of service instances of which the service is comprised, a respective request for a respective status of the service instance, wherein the respective status is based at least in part on whether at least one respective downstream service on which the service instance depends is operational;
   generating a status of the service based on the respective statuses provided by the plurality of service instances; and
   transmitting the status of the service to the health check engine.

16. The server computing device of claim 15, wherein the health check engine is included in a Domain Name System (DNS) server.

17. The server computing device of claim 16, wherein the DNS server maintains a data structure of associations between host names for one or more services and network addresses corresponding to one or more service instances for the service.

18. The server computing device of claim 15, wherein, for a given service instance of the plurality of service instances, the respective request causes the given service instance to issue, to the respective downstream service, a second request for an indication of whether the respective downstream service is operational.

19. The server computing device of claim 15, wherein generating the status of the service comprises:
   forwarding the health check message to each service instance of the plurality of service instances;
   receiving, from each service instance of the plurality of service instances, a respective response that includes a respective status of the service instance, wherein the respective status is based at least in part on respective statuses of downstream services on which the service instance depends;
   calculating a ratio based on a number of positive responses and a number of negative responses of the respective responses received from the plurality of service instances; and
   comparing the ratio to a threshold value to determine the status of the service.

20. The server computing device of claim 15, wherein:
   the server computing device implements a load balancer for the service and is communicatively coupled to one or more additional server computing devices, and
   each server computing device of the one or more additional server computing devices executes one or more server instances of the plurality of service instances.

* * * * *